Patented June 2, 1925.

1,540,548

UNITED STATES PATENT OFFICE.

GEORGE F. DOWNER, OF CLEVELAND, OHIO.

PROCESS OF PRODUCING STORAGE BATTERIES.

No Drawing.  Application filed August 25, 1922. Serial No. 584,340.

*To all whom it may concern:*

Be it known that I, GEORGE F. DOWNER, a citizen of the United States, residing at Cleveland, in the county of Cuyahoga and State of Ohio, have invented a certain new and useful Improvement in Processes of Producing Storage Batteries, of which the following is a full, clear, and exact description.

This invention relates to storage batteries and has for its object the provision of a new and improved process of preparing and forming the plates thereof which shall greatly reduce the time and current required, decrease the waste of material and the corrosion of equipment and permit the production of plates having uniform weight, density, conductivity, and quality; which shall permit the employment of mechanical pasting machines; which shall eliminate numerous expensive and difficult steps heretofore employed; while further objects and advantages of the invention will become apparent as the description proceeds.

In the commercial production of lead accumulators it has always been the practice to mix the lead oxide material with sulphuric acid or an active sulphate (such as the sulphate of ammonia) to form a paste which is applied to the grid or frame which constitutes the skeleton of the plate; owing to the rapid setting of a sulphuric acid paste it has been customary in all cases to neutralize it to some extent with ammonia, and to eliminate the latter the plates are allowed to dry for a period which also renders the plate safe to handle and free from disintegration in the electrolyte, this drying being accompanied by a pronounced degree of sulphation of the plate; these plates are then given what is called the "forming charge" by being electrolyzed in a sulphuric acid bath in large gangs, until the positive plates are changed largely to lead peroxide and the negative plates largely to spongy metallic lead. The plates are then removed from the electrolyte of the forming bath, assembled in small positive and negative gangs with their intervening separators, introduced into the battery jars, welded to the respective positive and negative terminals, and given an "initial charge."

This process entails certain marked disadvantages, chief among which are the following:

The mixture of lead oxide and sulphuric acid is a very corrosive one and has always hitherto prevented the use of machines for applying the same, added to which is the fact that a continuous reaction occurs between the ingredients from the instant the paste is first prepared; the result is that a crystalline formation of lead sulphate is produced in the mixing apparatus which formation is mechanically broken up during the pasting operation with the production of a non-homogenous plate, this lack of homogeneity increasing with the lapse of time so that while the first plates made from each batch always exhibit a high degree of uniformity and take their charge easily, the last plates are of very inferior quality. A second disadvantage is that the paste must either be made frequently and in small quantities, which is incompatible with large scale production, or the quality of the plates will be impaired which is practically what happens. Another disadvantage is that the drying of the plates produces such a fixed sulphation as to render it difficult to convert the positive plates into the peroxide form and the negative plates into the metallic condition, this requiring a large expenditure of time and current in the subsequent "forming" operation. A fourth disadvantage is that the rearrangement of the plates after forming affords an opportunity for serious deterioration because of the fact that they are very unstable chemically, the positive plate losing oxygen very readily and the negative plate becoming very quickly sulphated in contact with air. Indeed the negative plates can be exposed to the air only briefly lest the sulphuric acid contained within the pores react upon the lead with the evolution of a very material quantity of heat and the production of an excess amount of lead sulphate. Also in this step great numbers of plates become so cracked and checked that they must be discarded. A further disadvantage is that the action of the acid paste on the lead grids is to coat the same with a thin film of lead sulphate which is a non-conductor of electricity and thus to some degree insulates the paste.

It has never been supposed that a successful plate could be made by the use of a paste of lead oxide and water for the reason that upon subsequently immersing such plate in acid the paste soon detaches itself from the grid; but I have discovered that by the use of certain materials and the observance of suitable precautions I can not only produce a plate with a paste of lead oxide and water which will be free from disintegration when added to the acid, but by the use of such paste I can dispense with the usual forming charge, assemble these plates directly into the final battery, complete with their intervening separators, and produce a finished battery with only a single electrolysis, and no subsequent rearrangement of the plates, and secure a superior electrical contact between the paste and grid.

Any type of lead oxide, either red lead or litharge, can be employed although I have found those oxides most desirable which occur in the form of flat or elongated plates or scales, which I term "tabular" although granules may be of other shapes within the scope of my invention.

For the positive plate I use a mixture of this red lead and litharge, preferably with a small addition of some porosity producing agent such as magnesium sulphate; I do not limit myself to any fixed proportions of the red lead and litharge but instance equal parts as a suitable mixture. For the negative plate I preferably employ pure litharge. These materials after having been thoroughly mixed with distilled water are embedded in the grids in any suitable manner, either by hand or by machine. The mixture is entirely inert and suffers no chemical action no matter how long it stands so that the plates made therefrom are perfectly uniform. I also find it very advantageous to pass these pasted plates through a roll or series of rolls which cause the plastic mixture to become evenly imbedded and firmly compacted; and I further find it advantageous to cover certain of these rolls with woven wire cloth or canvas, either in a close mass or in the form of an endless belt; so that the surfaces of the plates become uniformly roughened, thereby increasing the active surface and decreasing the area which contacts with the surfaces of the separators. This rolling step is rendered possible by the non-corrosive nature of the paste.

When the rolling of the plates is omitted the same may be passed instantly from the pasting operation to a bath of sulphuric acid having a specific gravity from about 1.100 to about 1.300 in which they are left for a period of time, from about one-half hour to about twenty-four hours depending upon the density and hardness desired. I find that a soaking for six hours in a bath of specific gravity 1.200 produces a very satisfactory plate. In case the rolling step is employed or the plates are for any other reason delayed in passing from the pasting to the acid, they are momentarily dipped or sprayed with water so as to fill the pores which prevents their disintegration upon contact with the acid.

After soaking in this acid bath for the desired length of time, they are removed, assembled in the customary manner with interposed separators of the customary or any desired material and introduced into the jars of the finished battery. They are then connected to the usual terminals, by positive and negative, the jar filled with distilled water, and charging current applied at a voltage sufficient to produce a current of say one-twenty-fifth ampere per square inch of plate surface. Owing to the dilution of the electrolyte, which at the start contains only a small amount of sulphuric acid dissolved from the surfaces of the plates, this charging current may require a potential of as much as $3\frac{1}{2}$ volts per cell at the start, but this is slowly reduced as the charging proceeds until by the time the cell is fully charged the gravity of the electrolyte will be found generally upwards of 1.200 depending upon the proportion of plate volume to liquid capacity. When the plates are fully charged it is only necessary to fortify the electrolyte with a small addition of concentrated acid to bring it up to the customary gravity of 1.275.

As a result of the uniform texture of the plates caused by pasting them with a non-active composition I found it possible to produce plates of very great uniformity; by the herein described procedure of electrolyzing the plates in a solution of very low conductivity I have found it possible to desulphate the plates more quickly and uniformly than heretofore thus producing a mass of high mechanical strength combined with the desired porosity, thus producing a battery combining long life and high discharge rate. The possession of a roughened or striated surface is a benefit because of the more complete access of the electrolyte thereto despite the presence of the separators, although this is not imperative. I do not, however, limit myself to combining the initial charge and the forming charge since many of the advantages of a water paste over an active paste can be enjoyed without this; and I do not limit myself to the employment of any fixed density or composition of the electrolyte in which the forming is effected, since many of the advantages of my water paste can be obtained in combination with the established method of forming, although the plates so formed do not exhibit the same degree of uniformity. However, the low gravity charging I have described appears to be advantageous only in connection with plates containing a considerable proportion of free acid to combined acid, which to a considerable degree excludes plates which have been coated with acid paste and dried.

I do not restrict myself to forming in an electrolyte of the extreme dilution I have described, but may use any concentration up to about 1.050; this is sufficiently low so that the acid expelled during the forming will not raise the final concentration above the normal value viz, 1.275. My observation is that the use of a low density solution and high voltage charging current at the beginning of the forming operation has a peculiarly advantageous effect upon the plates by initiating the desulphating in a more uniform manner than with higher electrolyte concentrations and lower voltages, so that the plates become thoroughly formed even though the later part of the process be performed at normal concentration and voltage.

I do not restrict myself to the use of pure water as a dipping bath since it is possible to use successfully numerous solutions of substances which are harmless and inactive as regards a battery, as will be understood by battery makers, and all these solutions I include within the term "having the hereindescribed properties of water" since the essential properties for the present purpose are those of wetting and filling the pores without detrimental chemical reaction. Accordingly by the terms "water", "waterpaste", etc. I do not limit myself to the use of chemically pure water but only to the use of water which is free from deleterious or reactive solutes; and in the same way, while I have described the paste as composed essentially of lead oxide, I do not exclude the use of any of the various so-called "fillers" or "porosity agents" well known in the art.

Having thus described my invention what I claim is:

1. The process of producing a storage battery plate which contains the steps of pasting a grid with a paste of lead oxide and water and subsequently immersing the same prior to any material drying and while the surface pores are full of water, in a solution of sulphuric acid having a specific gravity between about 1.050 and about 1.300 until the paste is sufficiently sulphated.

2. The process of producing a storage battery plate which contains the steps of pasting a grid with a substantially neutral paste of lead oxide and water, dipping the same in a bath having the hereindescribed properties of water, and, without drying, introducing the same in a solution of sulphuric acid having a specific gravity between about 1.050 and about 1.300.

3. A composition of matter for pasting storage battery grids containing tabular lead oxide and water in paste form.

4. The process of producing a storage battery plate which contains the steps of pasting a grid with a paste of lead oxide and water, pressing the pasted plates to compact the paste, filling the surface pores with water, and immediately immersing the pasted plates in a solution of sulphuric acid and water having a specific gravity between about 1.050 and about 1.300.

5. The process of producing a storage battery which contains the steps of pasting the plates with a mixture of lead oxide and water, converting the oxide to sulphate in situ, and subsequently electrolyzing the same in substantially pure water.

6. The process of producing storage batteries which contains the steps of subjecting positive and negative plates pasted with red lead and litharge respectively to the action of sulphuric acid solution whereby sulphates are formed in situ, transferring said plates to a bath of substantially pure water, and charging the same at a substantially constant current density whereby the plates are desulphated and the electrolyte raised approximately to normal strength.

7. The process of producing storage batteries which contains the steps of pasting the positive and negative plates with mixtures containing essentially red lead and litharge with water, sulphating the same in situ, inserting the plates in alternation into the permanent jar interspersed with suitable separators, adding substantially pure water, charging the plates at higher than the normal cell voltage and decreasing such potential as the concentration of the electrolyte is increased by the decomposition of the lead sulphate.

8. The process of producing storage batteries which contain the steps of pasting the plates with nonsulphated oxides of lead, sulphating the same in situ, assembling the sulphated plates in final form, and electrolyzing the same in a solution of such extreme dilution that the expelled sulphuric acid shall raise the gravity of the electrolyte substantially to the normal condition.

9. The process of producing storage batteries which contains the steps of pasting the plates with nonactive mixtures containing lead oxide and water, immersing the pasted plates in sulphuric acid solution while the pores are filled with water, soaking the same in such solution until sulphated to the desired degree, and afterwards electrolyzing the same in a bath having a concentration materially less than that in which the same were soaked.

In testimony whereof, I hereunto affix my signature.

GEORGE F. DOWNER.

DISCLAIMER.

1,540,548.—*George F. Downer*, Cleveland, Ohio. PROCESSES OF PRODUCING STORAGE BATTERIES. Patent dated June 2, 1925. Disclaimer filed November 11, 1925, by the patentee.

Hereby enters this disclaimer to that part of the claim in said specification which is in the following words, to wit, claim 1:

"1. The process of producing a storage battery plate which contains the steps of pasting a grid with a paste of lead oxide and water and subsequently immersing the same prior to any material drying and while the surface pores are full of water, in a solution of sulphuric acid having a specific gravity between about 1.050 and about 1.300 until the paste is sufficiently sulphated."

[*Official Gazette November 24, 1925.*]